(12) United States Patent
Pandya et al.

(10) Patent No.: US 11,403,253 B2
(45) Date of Patent: Aug. 2, 2022

(54) TRANSPORT PROTOCOL AND INTERFACE FOR EFFICIENT DATA TRANSFER OVER RDMA FABRIC

(71) Applicant: Microsoft Technology Licensing, LLC, Redmond, WA (US)

(72) Inventors: Madhav Himanshubhai Pandya, Redmond, WA (US); Aaron William Ogus, Woodinville, WA (US); Zhong Deng, Woodinville, WA (US); Weixiang Sun, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 16/149,066

(22) Filed: Oct. 1, 2018

(65) Prior Publication Data

US 2020/0089649 A1 Mar. 19, 2020

Related U.S. Application Data

(60) Provisional application No. 62/730,847, filed on Sep. 13, 2018.

(51) Int. Cl.
*G06F 16/16* (2019.01)
*G06F 15/173* (2006.01)
*H04L 49/901* (2022.01)
*H04L 69/326* (2022.01)

(52) U.S. Cl.
CPC ...... *G06F 15/17331* (2013.01); *H04L 49/901* (2013.01); *H04L 69/326* (2013.01)

(58) Field of Classification Search
CPC ..... H04L 67/12; H04L 67/22; H04L 67/1097; H04L 69/12; H04L 69/16; H04L 69/22; H04L 69/161; H04L 69/163; H04L 69/166; H04L 47/10; H04L 47/12; H04L 47/50;
(Continued)

(56) References Cited

U.S. PATENT DOCUMENTS 5,473,604 A * 12/1995 Lorenz ............... H04L 12/5601
370/229
6,981,051 B2 * 12/2005 Eydelman ............... G06F 9/54
370/231
(Continued)

OTHER PUBLICATIONS

Zcopy, "Education and Sample Code for RDMA Programming, Oct. 8, 2010, retrieved from https://zcopy.wordpress.com/" on Sep. 27, 2018, 6 pages.
(Continued)

*Primary Examiner* — Farzana B Huq

(57) ABSTRACT

Described herein is a system and method for utilizing a protocol over RDMA network fabric between a first computing node and a second computing node. The protocol identifies a first threshold and a second threshold. A transfer request is received, and, a data size associated with the transfer request is determined. Based up the data size associated with the transfer request, one of at least three transfer modes is selected to perform the transfer request in accordance with the first threshold and the second threshold. Each transfer mode utilizes flow control and at least one RDMA operation. The selected transfer mode is utilized to perform the transfer request.

20 Claims, 15 Drawing Sheets

TRANSMISSION
STALL DUE TO
DELAYED CREDIT
UPDATE
(FLOW CONTROL
KICK IN)

(58) Field of Classification Search
CPC ............. H04L 47/2441; H04L 47/2408; H04L 47/6255
USPC ................ 709/209, 211–212, 217, 228, 237, 709/249–250; 370/230, 400, 402, 412
See application file for complete search history.

(56) References Cited

U.S. PATENT DOCUMENTS

| | | | | |
|---|---|---|---|---|
| 7,917,597 | B1* | 3/2011 | Lentini | G06F 13/28 709/212 |
| 2006/0004904 | A1* | 1/2006 | Sarangam | H04L 69/161 709/200 |
| 2006/0031600 | A1* | 2/2006 | Ellis | G06F 13/28 710/22 |
| 2006/0230119 | A1* | 10/2006 | Hausauer | H04L 47/6265 709/216 |
| 2006/0274748 | A1* | 12/2006 | Nakashima | H04L 1/1835 370/389 |
| 2008/0235409 | A1* | 9/2008 | Ryzhykh | H04L 47/30 710/22 |
| 2009/0319701 | A1 | 12/2009 | Mehrotra | |
| 2011/0246598 | A1 | 10/2011 | Pinkerton et al. | |
| 2016/0226951 | A1 | 8/2016 | Talpey et al. | |
| 2019/0079895 | A1* | 3/2019 | Kim | G06F 3/061 |

OTHER PUBLICATIONS

Recio, Renato, "A Tutorial of the RDMA Model", Sep. 15, 2006, retrieved from "https://www.hpcwire.com/2006/09/15/a_tutorial_of_the_rdma_model-1/" on Sep. 27, 2018, 18 pages.

MacArthur, Patrick, "URDMA: RDMA Verbs Over DPDK", OpenFabrics Alliance 13th Annual Workshop 2017, Mar. 28, 2017, 30 pages.

Microsoft Corporation, "Improve performance of a file server with SMB Direct", Apr. 4, 2018, 4 pages.

Cisco SFS InfiniBand Host Drivers User Guide for Linux, "Sockets Direct Protocol", retrieved from "https://www.cisco.com/c/en/us/td/docs/server_nw_virtual/commercial_host_driver/host_driver_linux/user/guide/hdugli32/sdp.pdf" on Sep. 27, 2018, 8 pages.

* cited by examiner

TRANSPORT PROTOCOL AND INTERFACE FOR EFFICIENT DATA TRANSFER OVER RDMA FABRIC

RELATED APPLICATION

This application claims priority to U.S. Provisional Application No. 62/730,847, filed Sep. 13, 2018, entitled "Transport Protocol and Interface for Efficient Data Transfer Over RDMA Fabric", the disclosure of which is hereby incorporated by reference herein in its entirety.

BACKGROUND

Remote direct memory access (RDMA) allows read and/or write requests from application(s) of two separate computing nodes without involving system processor(s) of either computing node. In some embodiments, RDMA is thus a transport layer protocol available over high-speed network interconnects which allows direct memory access between two computing nodes. For example, high speed interconnect technologies such as InfiniBand, R-RoCE and iWARP are network protocols that support RDMA.

SUMMARY

Described herein is a system for utilizing an interface for network transport, comprising: a computer comprising a processor and a memory having computer-executable instructions stored thereupon which, when executed by the processor, cause the computer to: provide the interface for using a network transport protocol between a first computing node and a second computing node, the protocol identifying a first threshold and a second threshold; at the interface, receive a transfer request; determine a data size associated with the transfer request; by the interface using the protocol, based up the data size associated with the transfer request, select one of at least three transfer modes to perform the transfer request in accordance with the first threshold and the second threshold, wherein each transfer mode utilizes flow control and at least one RDMA operation; and by the interface using the protocol, utilize the selected transfer mode to perform the transfer request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
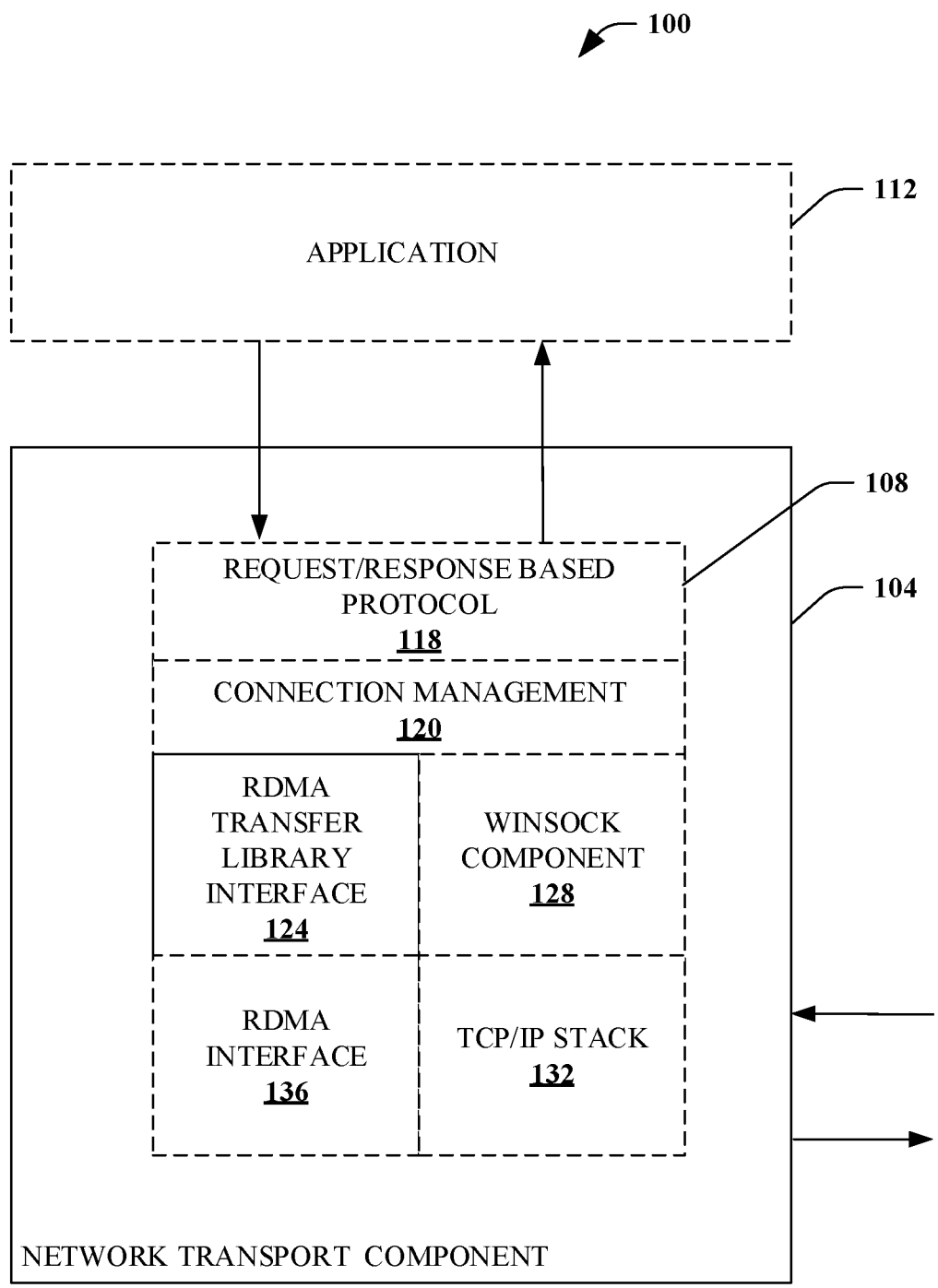
FIG. 1 is a functional block diagram that illustrates a system for utilizing an interface for network transport.

Various technologies pertaining an interface for efficiently facilitating RDMA transfer(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding efficiently facilitating RDMA transfer(s). What follows are one or more exemplary systems and methods.

Aspects of the subject disclosure pertain to the technical problem of utilizing RDMA to perform data transfer(s). The technical features associated with addressing this problem involve providing an interface for using a network transport protocol between a first computing node and a second computing node, the protocol identifying a first threshold and a second threshold; at the interface, receiving a transfer request (e.g., from an application executing on the first computing node); determining a data size associated with the transfer request; by the interface, based up the data size associated with the transfer request, selecting the transfer request to one of at least three transfer modes in accordance with the first threshold and the second threshold, with each transfer mode utilizing credit-based flow control and at least one RDMA operation; and, utilizing the selected transfer mode to perform the transfer request. Accordingly, aspects of these technical features exhibit technical effects of reducing processor involvement in data transfer(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Remote direct memory access (RDMA) allows read and/or write requests from application(s) of two separate computing nodes without involving system processor(s) of either computing node. Described herein is an interface that utilizes one of at least three transfer modes (e.g., small, medium, large with copy, and/or large) based upon a data size associated with a transfer request. Each of the transfer modes utilizes credit-based flow control and at least one RDMA operation.

Determination of which of the transfer modes to utilize can be based upon at least one of a first threshold, a second threshold, and/or a third threshold. In some embodiments, the first threshold is a data size for which data transfer(s) less than or equal to the first threshold, a first transfer mode (e.g., small message) is a most efficient use of resource(s) (e.g., system processor(s), network bandwidth, and/or buffer size). In some embodiments, the second threshold is a data size for which data transfer(s) greater than the second threshold, a third transfer mode (e.g., large message with copy or large message) is a most efficient use of resource(s) (e.g., system processor(s), network bandwidth, and/or buffer size). In some embodiments, a third threshold is a data size for which data transfer(s) greater than the third threshold, a fourth transfer mode (e.g., large message).

Referring to FIG. 1, a system for utilizing an interface for network transport 100 is illustrated. The system includes a network transport component 104 having a network communication stack 108. The network transport component 104 and an application 112 are components of a computing node. In some embodiments, data transfer(s) between the computing node and other computing node(s) (not shown) are performed by the network transport component 104. The system 100 can efficiently and effectively utilize RDMA to perform high bandwidth, low latency transport of data.

The network communication stack 108 includes a request/response based protocol component 118 that is directly used by the application 112 using request and/or response object(s). The network communication stack 108 further includes a connection management component 120 that provides connection management, send queuing and/or request-response message mapping.

The network communication stack 108 also includes an RDMA transfer library interface 124. In some embodiments, the RDMA transfer library interface 124 is an upper-layer protocol over RDMA transport which provides socket-like byte stream interface. In some embodiments, the RDMA transfer library interface 124 can plug into an existing network stack, for example, in place of or co-existing with a conventional winsock component 128 and/or a TCP/IP stack component 132. The RDMA transfer library interface 120 can further utilize an RDMA interface 136 to perform network transfer(s) with other computing node(s) (not shown).

Conventionally, as network bandwidth increases, suboptimal system resource usage has occurred due to excessive CPU utilization/excessive memory bandwidth utilization, TCP incast, and/or interference across multiple network flows. A traditional TCP/IP protocol stack can have significant CPU overhead which increases with an increase in available network bandwidth. On both transmit and receive paths, data buffers are moved in memory multiple times, for example, raising memory-to-network bandwidth up to 4 to 1. "TCP incast" refers to an issue with a TCP congestion control algorithm in which network transport performance is significantly degraded with an increase in network bandwidth. TCP incast can result a node serving data to read simultaneously from N different sources in order to reconstruct data from available fragments when a data fragment becomes unavailable.

Interference across multiple network flows can result from conventional network infrastructure(s) in which multiple types of network flows go through common network link(s). High level classification of current flows is as follows:

TABLE 1

1. User traffic
2. Background System Traffic

In some embodiments, sharing common links across multiple network flows has been observed to cause performance degradation due to interference. For example, at times, background system traffic can excessively consume network resources leading to high latencies for user traffic. In order to overcome at least some suboptimal system resource usage these, in some embodiments, the system 100 can facilitate high bandwidth, low latency, very low CPU utilization, zero copy network operation(s), an ability to mark flow(s) into class(es) and/or reserve bandwidth for each class.

The RDMA transfer library interface 124 and the RDMA interface 136 utilize RDMA which is a communication mechanism which allows direct access to memory of remote node(s) using various operation(s). By way of explanation, the RDMA interface 136 can include an RDMA-enabled network interface controller (RNIC) and network fabric. RDMA operations are sometimes referred to as "verbs" which are generally vendor-specific.

RDMA provides two types of communications semantics: channel semantics (e.g., send-receive communication mode) and memory semantics (e.g., memory read, write). With respect to channel semantics, a send request needs a corresponding receive request to be posted at the RNIC of the remote computing node. Failure of the remote computing node to post a receive request results in the send message getting dropped and retransmitted for a user-specified amount of time. The receive request posted to the RNIC of the remote computing node points to a memory block where the RNIC receives incoming data. A send request of size M uses an entire receive buffer of size N on the remote computing node. If M<=N, the send succeeds with (N−M) bytes remain unused on the receive buffer. If M>N, the send fails.

For the memory semantics, one or more RDMA operations are available: RDMA Read (Local Memory Block←Remote Memory Block) and/or RDMA Write (Local Memory Block→Remote Memory Block). Read/Write operations are transparent at the remote computing node since the operations do not require the remote computing node to post a request descriptor or be involved in the operation. In both operations, a remote memory block is described by a memory descriptor. The initiator of the operation needs to know the remote memory descriptor while initiating the operation.

The RDMA programming model is completely asynchronous. It is based on three queues. A Send Queue (SQ) and a Receive Queue (RQ) are used to enqueue operations known as Work Queue Element (WQE). A pair of SQ and RQ makes a Queue Pair (QP). A connection is established by connecting local QP with remote QP. Notification of completion of WQEs is enqueued to a Completion Queue (CQ). Completion can also be posted on an IOCompletionPort. An application can either poll the completion queue or wait on IOCompletionPort to receive completion events from the RNIC.

In RDMA operations, memory blocks to be accessed need to be registered with the RNIC before use. Registration involves pinning virtual memory page(s) and transferring virtual-physical mapping to the RNIC. After the operation is completed, memory block can be de-registered. At this time, virtual pages are un-pinned and mapping is removed from the RNIC memory.

In some embodiments, registration/de-registration of memory block can have significant latency penalty. This is cost in RDMA data transfer which can be managed by the system 100. For example, in some examples, cost associated with the registration/de-registration is more than a cost associated with memcpy for block sizes less than 256 Kb.

Returning to FIG. 1, in some embodiments, the RDMA transfer library interface 124 supports a subset of Winsock application programming interface (API) which is used by connection management layer 120. This can include functions such as Socket, Send, Receive, Bind, Listen, Accept and/or Close. Additionally, the RDMA transfer library interface 120 can include functions to allow applications to request and/or release registered buffer from RDMA interface 136 (e.g., GetRegisteredBuffer, and/or ReleaseRegisteredBuffer).

The RDMA transfer library interface 124 maps send and/or receive call(s) to RDMA operation(s). The RDMA transfer library interface 124 can utilize one or more of the following design considerations. First, the buffers used in RDMA operation(s) must be registered. Hence, registration/de-registration cost are considered. Second, a receive must be pre-posted on the remote computing node before a send from the local peer. A send without a pre-posted receive causes the receiver to respond with a Receiver Not Read (RNR) which degrades network performance. Third, the Sender and the Receiver should be in agreement with a size of data being transferred in a send-receive operation. If the receive buffer is smaller than the send size, it results in a send failure. If the receive buffer is larger than the send size, it leads to underutilization of memory. Finally, transport is lossless. RDMA operation success implies guaranteed completion.

In view of these design constraints, in some embodiments, the RDMA transfer library interface 124 (e.g., network transport protocol) can classify a transfer request into one of three or more transfer modes (e.g., small, medium, large with copy, or large) using a first threshold (S), a second threshold (LC), and/or a third threshold (L). Small message(s) have an associated transfer size (s) of less than or equal to the first threshold (S).

In determining an appropriate first threshold (S), the following are considerations. First, in cases involving small messages when compared to S, each send uses up an entire receiver buffer of size S on the remote end. This can cause high buffer space underutilization on the remote computing node. This underutilization factor is controlled by S as a smaller S leads to lower underutilization.

Second, send size(s) greater than S would need to be fragmented in order to send the entire message. This leads to data fragmentation in user mode. Thus, a larger S can lead to lower fragmentation overhead. In some embodiments, the optimality constraints on S can be conflicting.

For large send, there is an additional overhead of sharing local memory descriptor to the remote computing node. However, a RDMA read of large enough block(s) of data makes the entire transfer more efficient. This leads to following the optimality constraints. If S is too small, smaller messages go through Large Send path and incur memory descriptor sharing overhead. If S is too large, there will be high memory underutilization in the small send path.

From these observations, the following can be concluded. For large messages (greater than a third threshold (L)), the large send path is efficient. For small messages, the small send path is efficient (Size<=S).

However, there is a subset of messages {M|S<Msize<=LC} which cannot be efficiently transferred using either the small message path, the large message with copy, and/or the large message path. To optimize this subset, a third transport mode, medium send, can be utilized by the system 100. The medium send path addresses the primary issue with the small send path by allowing variable length send(s) while still maintaining optimal memory utilization.

In some embodiments, when utilizing the medium send path, each peer shares a circular buffer with a remote computing node. When sending a medium sized message, the sender uses a RDMA write operation to write data on the remote peer's buffer. The local peer keeps track of a head pointer and a tail pointer of the remote buffer. The local peer advances the local tail offset based on the message size written. The remote peer keeps reading record from the head pointer and moves the head pointer towards the tail pointer as it completes written records. At regular intervals, the remote peer sends the local peer the position of the head pointer. On the local peer, when the head pointer and the tail pointer are equal (e.g., indicative of the circular buffer on the remote peer being full), the local peer pauses and waits for the remote peer to send an updated head pointer.

In some embodiments, segmentation can be avoided with this approach on all three send paths. In some embodiments, the values for the first threshold (S), the second threshold (LC), and/or the third threshold (L) are determined using latency and/or bandwidth measurements on the target network interconnect. For example, Optimal {S, LC, L}=Function {Network RTT, Node Memory BW}, where network RTT is the round trip time for a data packet on the target network, and, node memory BW is the node memory bandwidth.

In some embodiments, the maximum packet size of RDMA transport is 1 gigabyte and the maximum packet size of XRDMA transfer library interface 132 (MAX_XRDMA_PACKET_SIZE) is determined experimentally. In general, larger block size leads to less overhead and higher transfer bandwidth. However, this effect saturates at a block size. Large block size leads to loss of bandwidth when there are send failures. In some embodiments, the first threshold (S), the second threshold (LC), and/or a third threshold (L) for a message (M) are set forth as:

1<=Size (M)<=1K→Small Message (SM)
1K<Size (M)<=64K→Medium Message (MM)
64K<Size (M)<=256K→Large Message with copy (LC)
256K<Size (M)<=8 MB→Large Message (LM)

As previously noted, RDMA is a lossless transport protocol in which a successful send completion implies receipt of the message on the remote computing node. In some embodiments, due to receiver the buffer pre-posting constraint of RDMA, upper layer protocol(s) implement an end-to-end flow control to ensure that the sender never posts a send request when the receive buffer is not available on the remote computing node. To achieve this, the sender can keep track of how many receiver buffers on the receive end are available. The receiver further updates the sender regularly on a number of receive buffer(s) posted. In some embodiments, flow control can be implemented using credit-based flow control.

In this approach, a sender is given certain number of credits (e.g., predefined quantity and/or negotiated with particular receiver). Both the sender and the receiver keep track of credits with the sending losing a credit for every message sent. When the number of credits goes to zero, the sender must pause sending more messages. The receiver is responsible to replenishing credits back to the sender which is equal to the number of resources the receiver has allocated for the sender. The receiver can provide this replenishment in a credit update message which is sent from the receiver to the sender.

For purposes of explanation, the following terminology will be used:

C=Initial credit available to sender in credit units;
S=size of credit unit in bytes;
$C_A$=Unused credits available to sender in credit units;
$C_U$=Credits used for sends received by receiver in credit units;
$C_I$=Credits used for sends which are in flight in credit units;
$B_C$=Targeted bandwidth for current connection in Bytes/Sec/$B_L$
$B_L$=Max bandwidth available from underlying network in Bytes/Sec;
d=Round-trip link delay of underlying network in seconds.

The total credit is a sum of three components at any point in time: $C=C_A+C_U+C_I$. The receiver sends a credit update after every $\alpha*C$ [$0<=\alpha<=1$] units received. The parameter a controls how often credit update is sent back to the sender. It can be observed that bandwidth overhead of the credit update increases with a decrease in $\alpha*C$. In some embodiments, this overhead can be significantly reduced by including (e.g., piggybacking) the credit update information in a normal message (e.g., the header of a send message) sent by the receiver at any time. In some embodiments, a standalone credit update message is generated and sent by the receiver only if no such normal message(s) are available before a credit update must be performed, which happens when the remaining credit with the sender is $(1-\alpha)*C$ (which is $C_A+C_I$). In most interactive applications where the data is flowing in both directions, standalone credit update messages can thus usually be avoided.

In order to avoid a stall in transmission by the sender, the credit update message or credit update information provided in a normal message should reach the sender before the sender uses up this credit. Based on this, the following relation between $\alpha$, C, d and $B_C$ can be set forth. When $B_C*d<(1-\alpha)*C$, the receiver does not generate and send a standalone credit update message. This is the case of credit underflow. To achieve the targeted $B_C$ for the connection, the following should be true: $B_C*d=(1-\alpha)*C$. The parameter C controls the amount of memory used per connection. Given there are N total connections on a node, N*C memory will be used by the RDMA transfer library interface 124.

To determine $B_L$ bandwidth for a flow-controlled connection, the following must be true: $(1-\alpha)*C=B_L*d$. In some embodiments, for a particular network configuration, the BL is 40 Gbps and d is approximately 4 µs. This leads to be approximately 20 KB.

Figure 2:
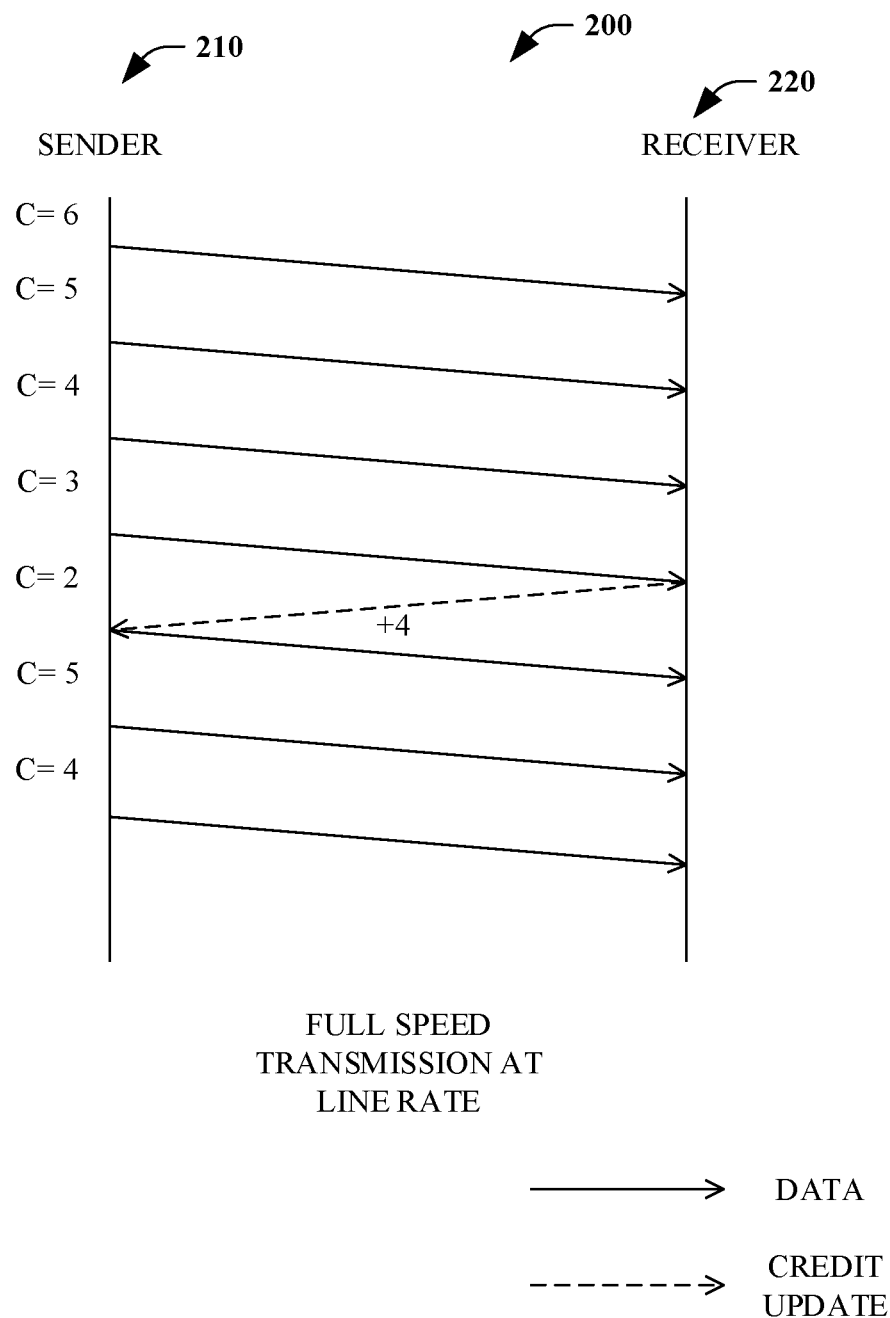
FIG. 2 is a timing diagram of a full speed transmission at line rate.

Turning to FIG. 2, a timing diagram of a full speed transmission at line rate 200 is illustrated. The timing diagram 200 illustrates an example of a sender 210 sending messages to a receiver 220. Upon receipt and processing of a fourth message, the receiver 220 sends a credit update message indicating that four messages have been processed.

Figure 3:
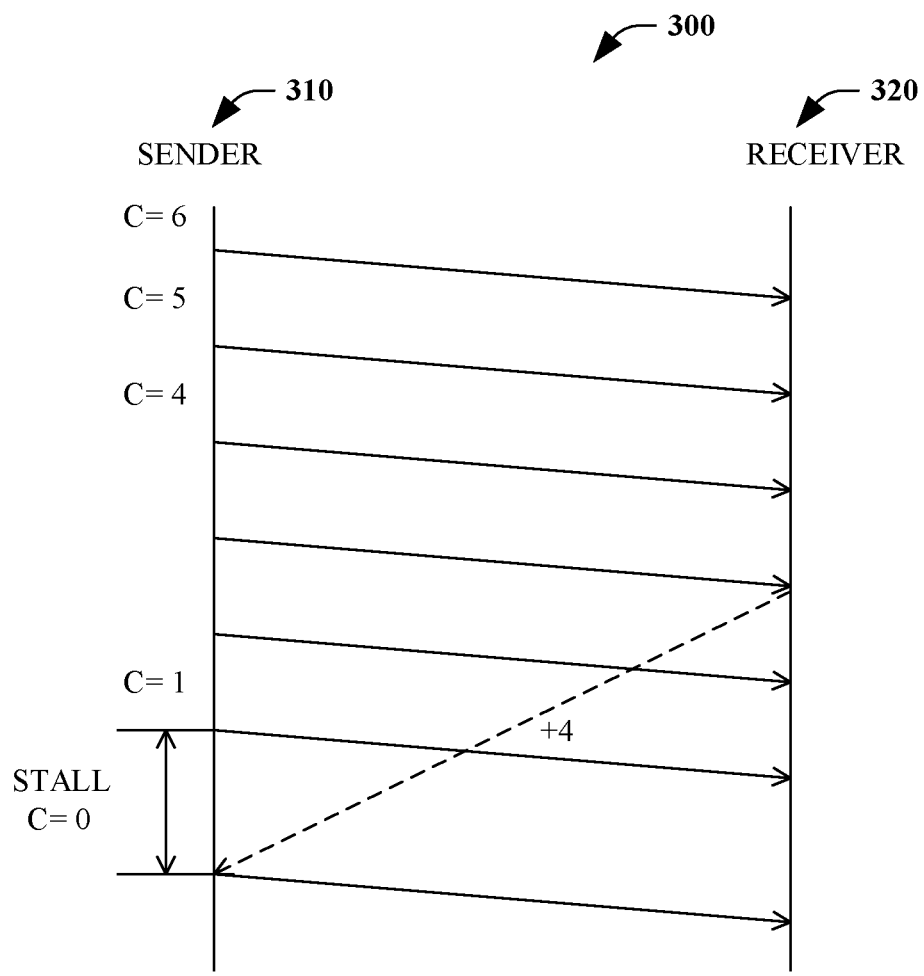
FIG. 3 is a timing diagram of a transmission stall due to delayed credit update.

Referring to FIG. 3, a timing diagram of a transmission stall due to delayed credit update 300 is illustrated. The timing diagram 300 illustrates an example of a sender 310 sending messages to a receiver 320. After the sixth message has been sent by the sender 310, since no credit update message has been received by the sender 310, the sender 310 is stalled from sending any further messages to the receiver 320. Upon receipt of a credit update message, the sender 310 can resume sending message(s) to the receiver 320.

Referring back to FIG. 1, as discussed above, the RDMA transfer library interface 124 handles data flow based on a size of the message in order to optimize memory utilization and reduce transfer latency. In some embodiments, buffer management is handled differently for each mode (e.g., small, medium, large with copy, and large). In some embodiments, flow control is utilized in each of the modes. In some embodiments, credit-based flow control is used. The RDMA transfer library interface 124 maintains a common buffer pool of registered memory shared across multiple connections.

For small message(s) (e.g., small message mode), data is sent using send-receive semantics. During a connection handshake, a size of receive buffer (S) and an initial credit (C) is negotiated between a sender computing node and a receiver computing node. During initialization, both the sender computing node and the receiver computing node prepare C number of receive buffers of size S.

Figure 4:
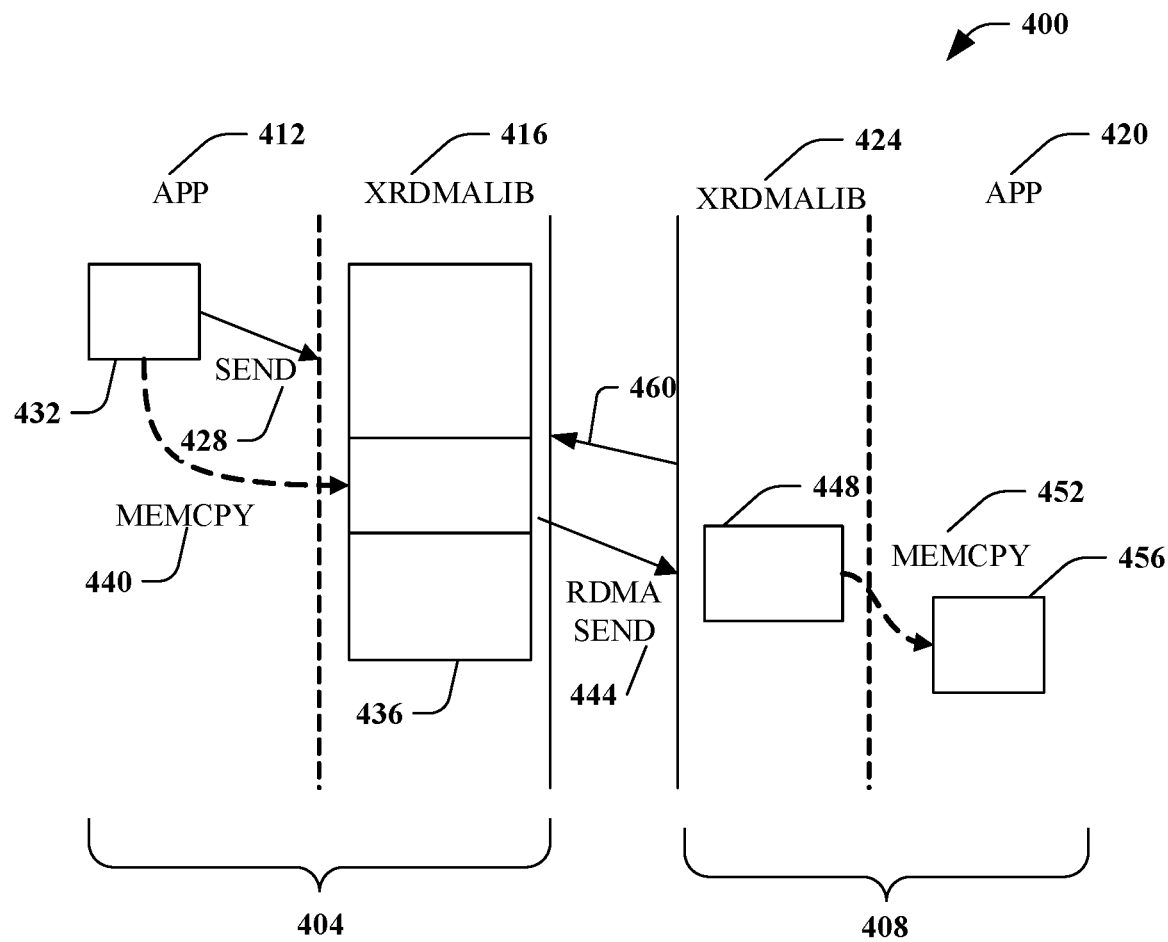
FIG. 4 is a communication diagram of sending a small message.

Referring to FIG. 4, a communication diagram of sending a small message 400 is illustrated. In some embodiments, the diagram 400 illustrates steps associated with sending a small message by the system 100 by a sender 404 to a receiver 408.

The sender 404 includes a sender application 412 and a sender XRDMA transfer library interface 416 (e.g., an instance of the RDMA transfer library interface 124). The receiver 408 includes a receiver application 420 and a receiver XRDMA transfer library interface 424 (e.g., an instance of the RDMA transfer library interface 124).

To begin sending of the small message, the sender 404 provides a send request 428 to the sender XRDMA transfer library interface 416. The sender 404 then copies the send message from a buffer 432 of the sender application 412 to a buffer of a registered buffer pool 436 of the sender XRDMA transfer library interface 416 using a memcpy operation 440.

The sender XRDMA transfer library interface 416 then posts an RDMA message 444 to a pre-posted receive buffer 448 of the receiver XRDMA transfer library interface 424. Using a memcpy operation 452, contents of the pre-posted receive buffer 448 are then copied to an application buffer 456 of the receiver 408. The receiver 408 also provides an indication 460 to the sender 404 that the message has been received. Latency associated with the sending the message can be determined as: memcpy (sender) 440+RDMA Send 444+memcpy (receiver) 452.

In some embodiments, a credit unit for flow control is the number of receive buffers 448. The sender 404 and receiver 408 can track credit-based flow control as discussed above.

The receiver 408 can send updates of credit to the sender 404 using send/receive semantics.

In some embodiments, the sender 404 pauses sending when credit is equal to 1. Credit must be greater than 1 to allow for the sender to send a credit update to the receiver 408. In this manner, credit look deadlock can be avoided.

Figure 5:
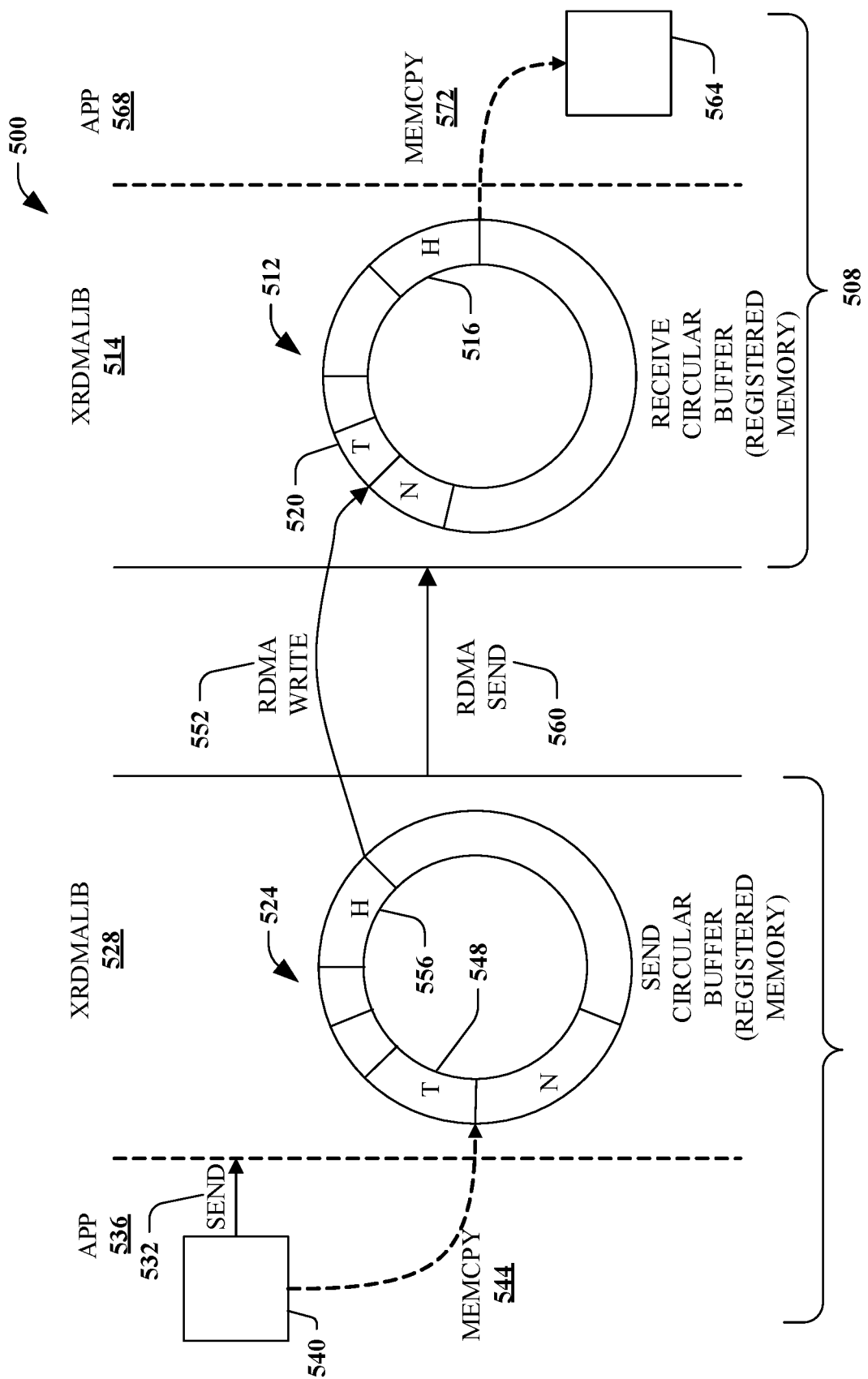
FIG. 5 is a communication diagram of sending a medium message.

Turning to FIG. 5, a communication diagram of sending a medium message 500 is illustrated. In some embodiments, the diagram 500 illustrates steps associated with sending a medium message by the system 100 by a sender 504 to a receiver 508.

In medium mode, an RDMA write is used to transfer data to the receiver 508. During a connection handshake, a size of receiver circular buffer (R) is negotiated between the sender 504 and the receiver 508.

A receive circular buffer 512 is maintained by a RDMA transfer library interface 514 on the receiver 508 with a head pointer 516 and a tail pointer 520. For purposes of explanation, the sender 504 "owns" the tail pointer 520 and can write to space available after a current position of the tail pointer 520 up to the head pointer 516. The head pointer 516 is owned by the receiver 508. The receiver 508 is responsible for moving received data from the receiver circular buffer 512 and moving the head pointer 516 ahead towards the tail pointer 520.

During initialization, two registered circular buffers of size R are registered, the receive circular buffer 512 and a send circular buffer 524 maintained by a RDMA transfer library interface 528 on the sender 504. A receive buffer descriptor is shared with the remote peer.

To begin sending of the medium message, a send request 532 is sent by an application 536 on the sender 504 to the RDMA transfer library interface 528 on the sender 504 regarding a message stored in a buffer 540. The message (e.g., medium message) is copied to the send circular buffer 524 using a memcpy operation 544 if there is enough space available after a tail pointer 548. Otherwise, the RDMA transfer library interface 528 on the sender 504 returns an indication that there is no space available in the queue to send the medium message at the current time.

Next, the sender 504 issues an RDMA write 552 for a record pointed to by a head pointer 556 of the send circular buffer 524. The sender 504 then provides an RDMA send with "Write Done (write size)" indication 560 to the receiver 508. The RDMA transfer library interface 514 on the receiver 508 copies the record pointed to by the head pointer 516 to a buffer 564 of an application 568 of the receiver 508 using a memcpy 572.

Send latency can be determined as: memcpy (sender)+ RDMA Write (MM)+RDMA Send+memcpy (receiver). In some embodiments, flow control can be performed by the sender 504 keeping track of the head pointer 516 and tail pointer 520 of the receiver circular buffer 512. The tail pointer 520 of the receiver is updated by the receiver 508 on receipt of the RDMA send after RDMA write 560. The sender 504 pauses operation when there is not enough space between the tail pointer 520 and the head pointer 516. The receiver 508 further provides updates to the sender 504 of changes in the head pointer 516. In some embodiments, credit update information can be provided (e.g., piggybacked) in a normal message from receiver to sender, thus incurring practically no overhead.

Figure 6:
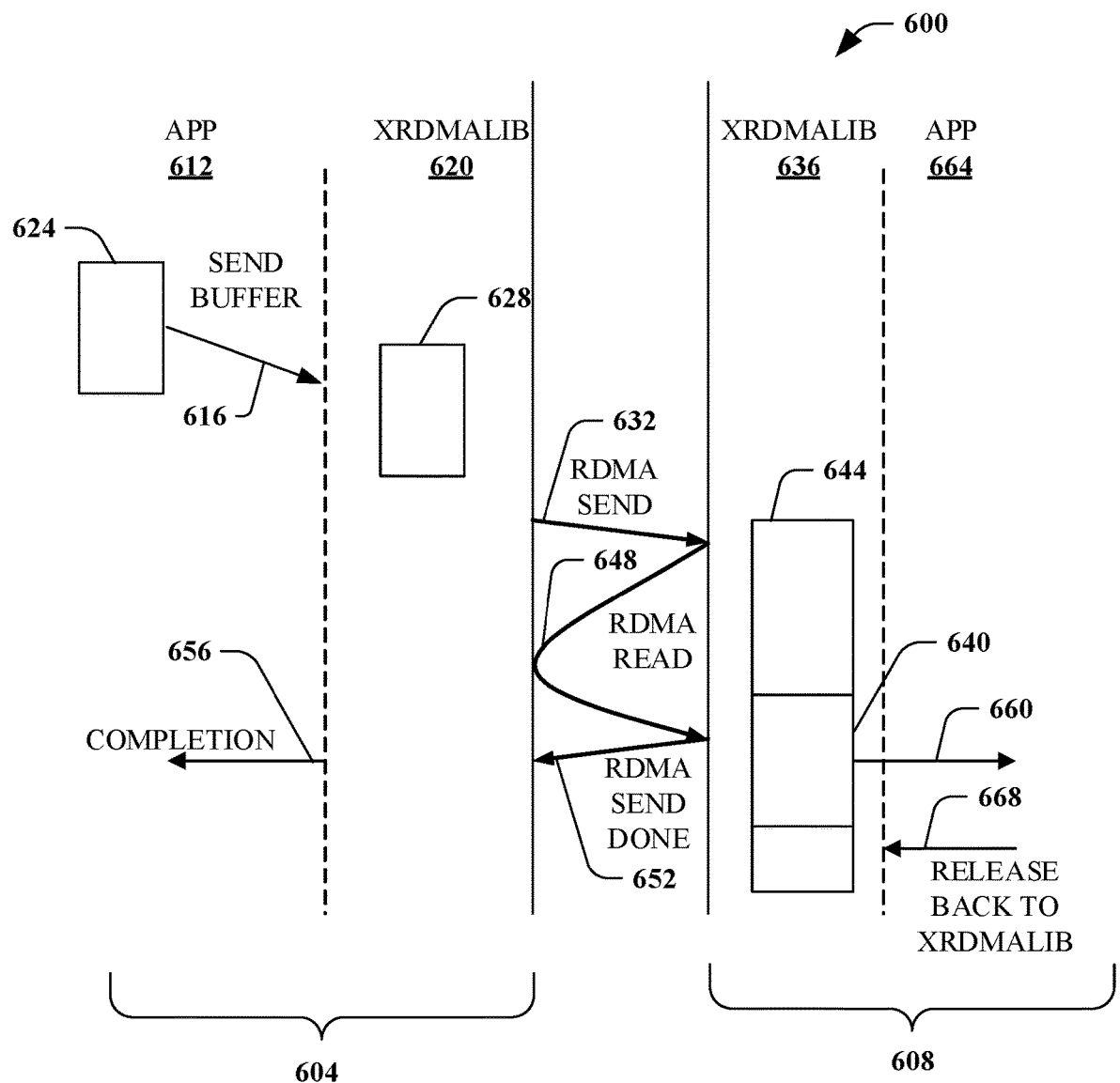
FIG. 6 is a communication diagram of sending a large message with copy.

Turning to FIG. 6, a communication diagram of sending a large message with copy 600 is illustrated. In some embodiments, the diagram 600 illustrates steps associated with sending a large message with copy by the system 100 by a sender 604 to a receiver 608.

First, an application 612 sends a send buffer 616 to an RDMA transfer library interface 620 of the sender 604. The RDMA transfer library interface 620 of the sender 604 obtains a registered buffer 628 from an RDMA pool and copies contents of the send buffer 616 into the registered buffer 628.

The RDMA transfer library interface 620 of the sender 604 next causes an RDMA send message 632 (with a local memory descriptor) to the receiver 608. An RDMA transfer library interface 636 of the receiver 608, selects a target buffer 640 from a registered buffer pool 644 of the receiver 608. The target buffer 640 is selected in accordance with a size provided in the send message 632 (with a local memory descriptor).

Next, the RDMA transfer library interface 636 of the receiver 608 performs an RDMA Read {Sender: Memory Descriptor→Receiver: Memory Descriptor} operation 648. The RDMA transfer library interface 636 of the receiver 608 then performs an RDMA Send with {Read done} operation 652. The RDMA transfer library interface 620 of the sender 604 then provides a completion indication 656 to the application 612.

The RDMA transfer library interface 636 of the receiver 608 can provide an indication 660 to an application 664 of the receiver 608. Thereafter, the application 664 can release 668 the target buffer 640 to the registered buffer pool 644.

Next, for sending large messages (messages with size>the third threshold (L)), the system 100 can use one RDMA send to send a local memory descriptor to the receiver. The receiver can use an RDMA read to read the data.

Figure 7:
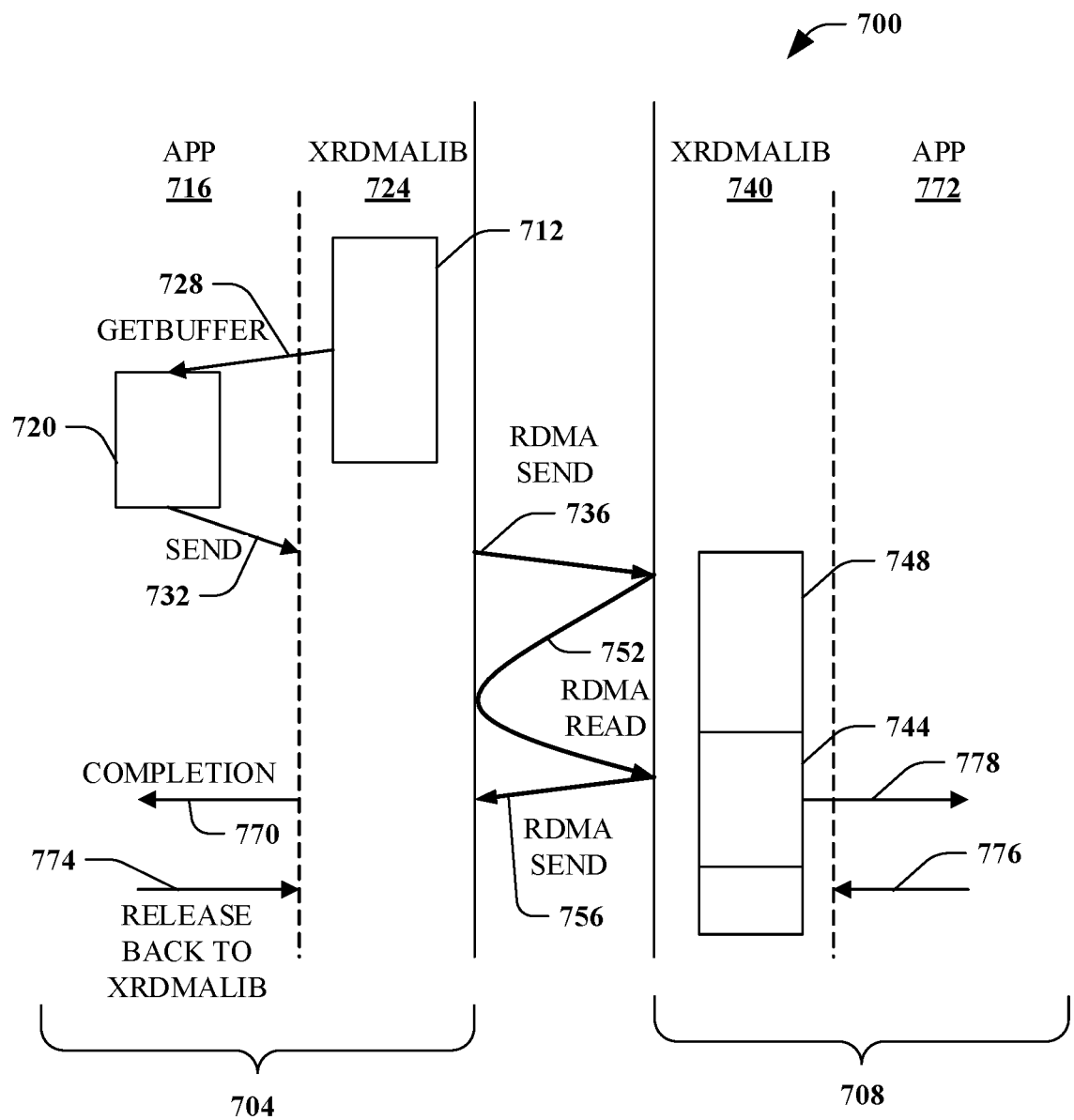
FIG. 7 is a communication diagram of sending a large message.
Figure 8:
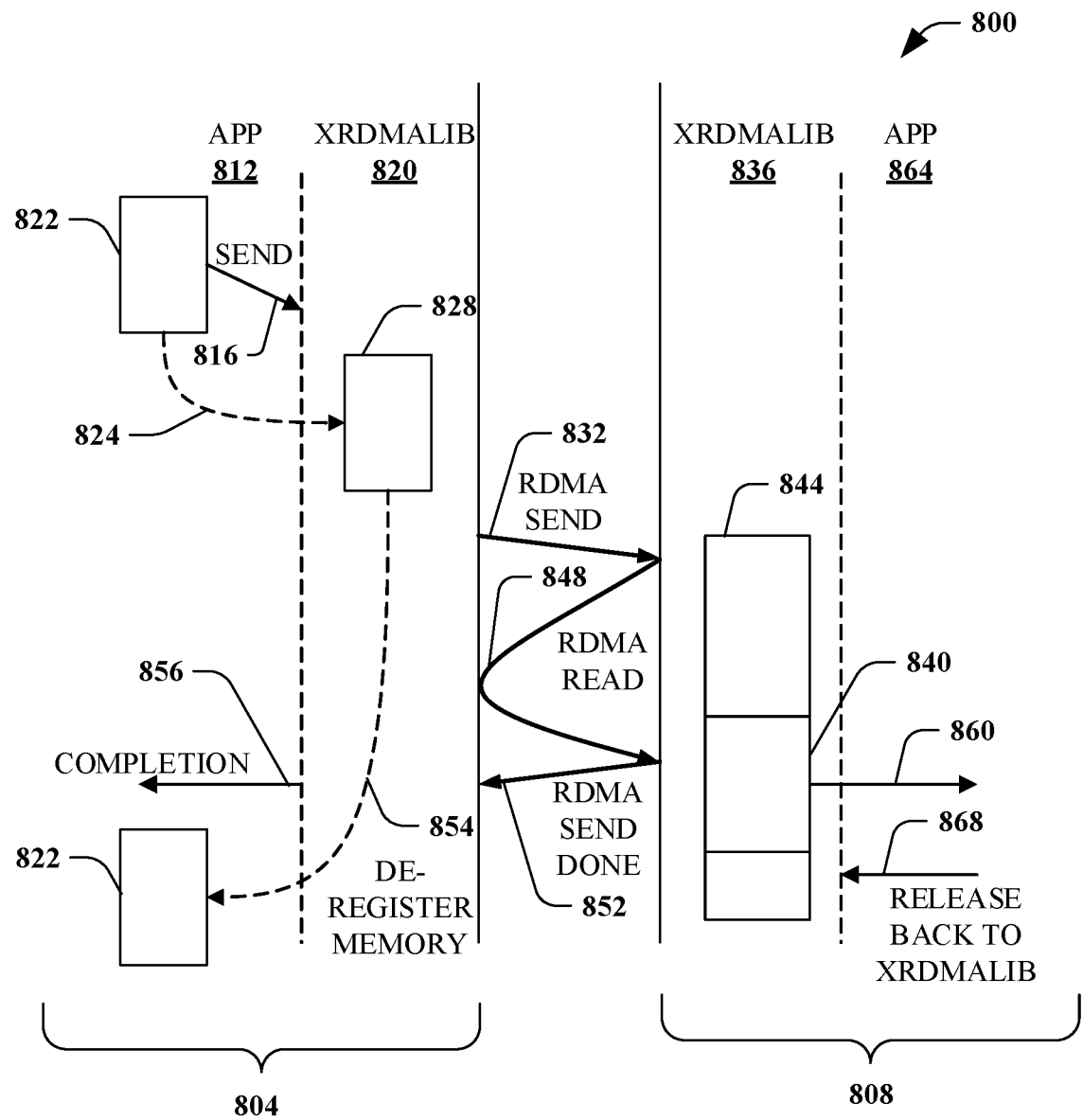
FIG. 8 is another communication diagram of sending a large message.

In large message mode, RDMA read is used to achieve zero-copy flow. In some embodiments, based on where the type of buffer used, there are two flows as below with slight difference in memory management. FIG. 7 illustrates an example in which a registered buffer is used. FIG. 8 illustrates an example in which a buffer is registered before being used.

Referring to FIG. 7, a communication diagram of sending a large message 700 is illustrated. In some embodiments, the diagram 700 illustrates steps associated with sending a large message by the system 100 by a sender 704 to a receiver 708 using a buffer from a registered buffer pool 712.

An application 716 of the sender 704 obtains a registered buffer 720 from the registered buffer pool 712 of an RDMA transfer library interface 724 of the sender 704 using GetBuffer( ) 728. The RDMA transfer library interface 724 of the sender 704 then receives a send request 732. The RDMA transfer library interface 724 of the sender 704 next causes an RDMA send message 736 (with a local memory descriptor) to the receiver 708.

An RDMA transfer library interface 740 of the receiver 708, selects a target buffer 744 from a registered buffer pool 748 of the receiver 708. The target buffer 744 is selected in accordance with a size provided in the send message 736 (with a local memory descriptor).

Next, the RDMA transfer library interface 740 of the receiver 708 performs an RDMA Read {Sender: Memory Descriptor→Receiver: Memory Descriptor} operation 752. The RDMA transfer library interface 740 of the receiver 708 then performs an RDMA Send with {Read done} operation 756 to communicate to the sender 704 that the operation has been completed. The RDMA transfer library interface 724 of the sender 704 then provides a completion indication 760 to the application 716. The application 716 can then release 764 the buffer 720 to the registered buffer pool 712.

The RDMA transfer library interface 740 of the receiver 708 can provide an indication 768 to an application 772 of the receiver 708. Thereafter, the application 772 can release 776 the target buffer 744 to the registered buffer pool 748.

Referring to FIG. 8, a communication diagram of sending a large message using an unregistered buffer 800 is illustrated. In some embodiments, the diagram 800 illustrates steps associated with sending a large message by the system 100 by a sender 804 to a receiver 808.

First, an application 812 sends a send request 816 to an RDMA transfer library interface 820 of the sender 804 regarding an application buffer 822. The RDMA transfer library interface 820 of the sender 804 registers 824 memory of the application buffer 822 to become a registered buffer 828.

The RDMA transfer library interface 820 of the sender 804 next causes an RDMA send message 832 (with a local memory descriptor) to the receiver 808. An RDMA transfer library interface 836 of the receiver 808, selects a target buffer 840 from a registered buffer pool 844 of the receiver 808. The target buffer 840 is selected in accordance with a size provided in the send message 832 (with a local memory descriptor).

Next, the RDMA transfer library interface 836 of the receiver 808 performs an RDMA Read {Sender: Memory Descriptor→Receiver: Memory Descriptor} operation 848. The RDMA transfer library interface 836 of the receiver 808 then performs an RDMA Send with {Read done} operation 852.

The RDMA transfer library interface 820 of the sender 804 then de-registers 854 the registered buffer 828 which returns to buffer 822 of application 812. The RDMA transfer library interface 820 of the sender 804 then a completion indication 856 to the application 812.

The RDMA transfer library interface 836 of the receiver 808 can provide an indication 860 to an application 864 of the receiver 808. Thereafter, the application 864 can release 868 the target buffer 840 to the registered buffer pool 844.

Latency of a large message send can be determined as: Latency=RDMA Send (S→R)+RDMA Read (LM)+RDMA Send(R→S). With respect to flow control, the sender 804 maintains a size of the receiver 808 registered buffer pool 844 the receiver 808 can use. In some embodiments, the receiver 808 maintains a single buffer pool for all the connections and dynamically shares the buffers. The receiver 808 sends back a size of the buffer that can be used by the sender 804.

FIGS. 9-14 illustrate exemplary methodologies relating to utilizing an interface using a protocol for network transport. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 9:
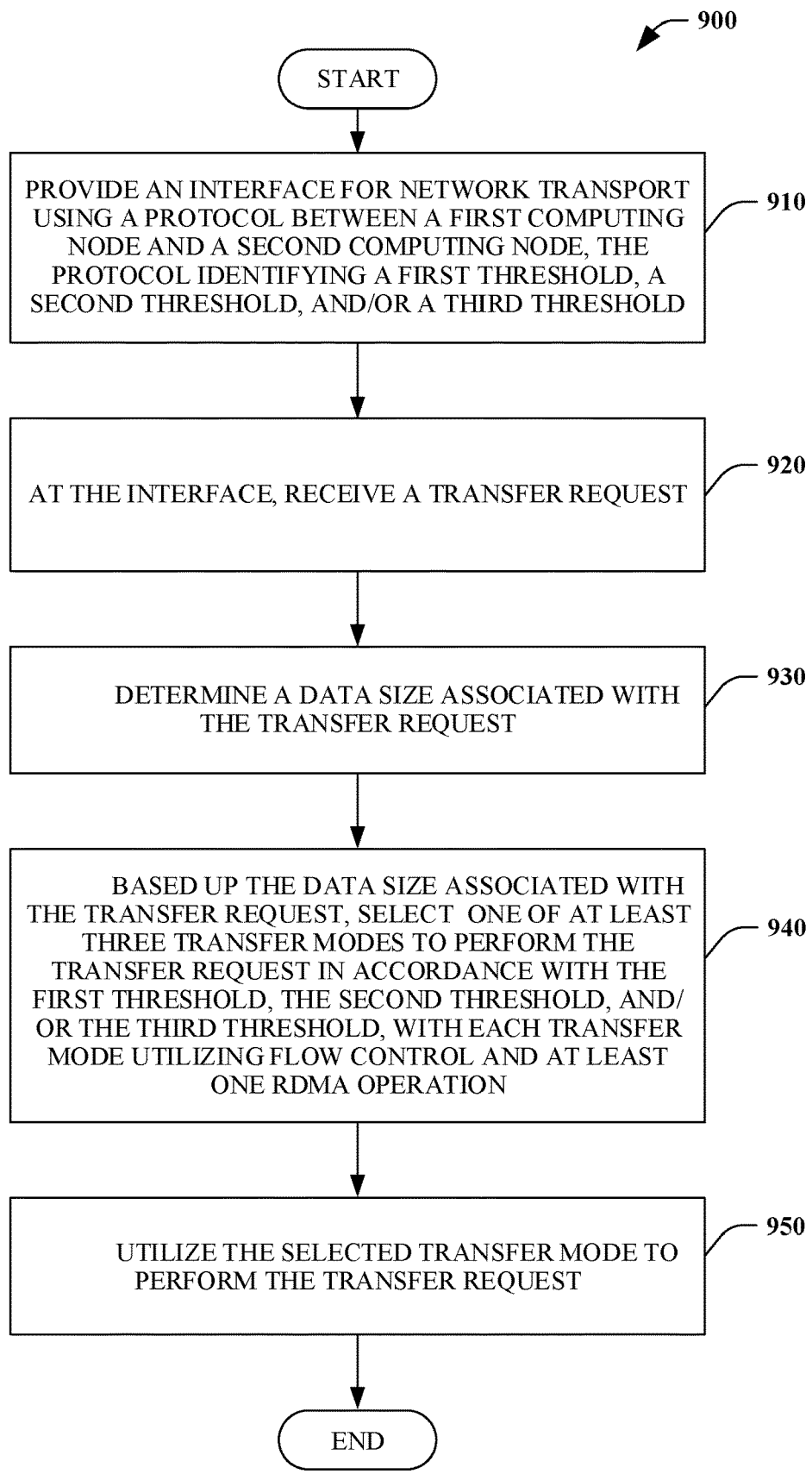
FIGS. 9-14 are flow charts of methods of utilizing an interface using a protocol for network transport.

Referring to FIG. 9, a method of utilizing an interface using a protocol for network transport 900 is illustrated. In some embodiments, the method 900 is performed by the system 100.

At 910, an interface for network transport using a protocol between a first computing node and a second computing node is provided (e.g., RDMA transfer library interface 124). The protocol identifies (e.g., determines) a first threshold (S), a second threshold (LC) and/or a third threshold (L).

At 920, a transfer request is received at the interface. At 930, a data size associated with the transfer request is determined. At 940, based up the data size associated with the transfer request, one of at least three transfer modes is selected to perform the transfer request in accordance with the first threshold, the second threshold, and/or the third threshold. Each transfer mode utilizes flow control and at least one RDMA operation. At 950, the selected transfer mode is utilized to perform the transfer request.

Figure 10:
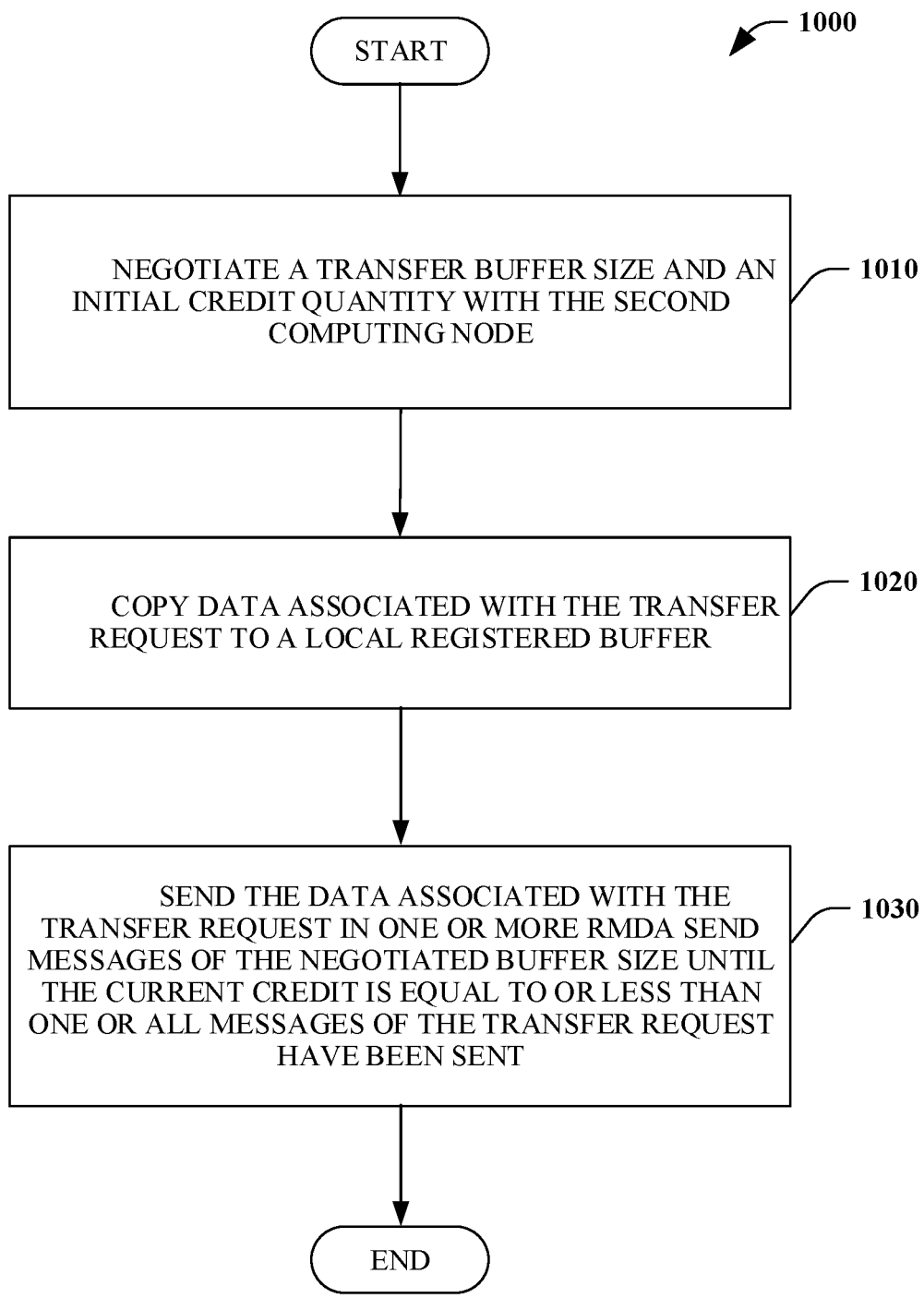

Next, turning to FIG. 10 a method of utilizing an interface using a protocol for network transport 1000 is illustrated. In some embodiments, the method 1000 is performed by the system 100. The method 1000 corresponds to a small message send, for example, when a size associated with the transfer request is less than or equal to a first threshold.

At 1010, a transfer buffer size and an initial credit quantity are negotiated with the second computing node. At 1020, data associated with the transfer request is copied to a local registered buffer. At 1030, the data associated with the transfer request is sent in one or more RDMA send messages of the negotiated buffer size until a current credit is equal to or less than one or all send messages of the transfer request have been sent. The current credit is initially set to the initial credit quantity and decremented each time a message is sent. The current credit is replenished based upon receipt of credit update message(s).

Figure 11:
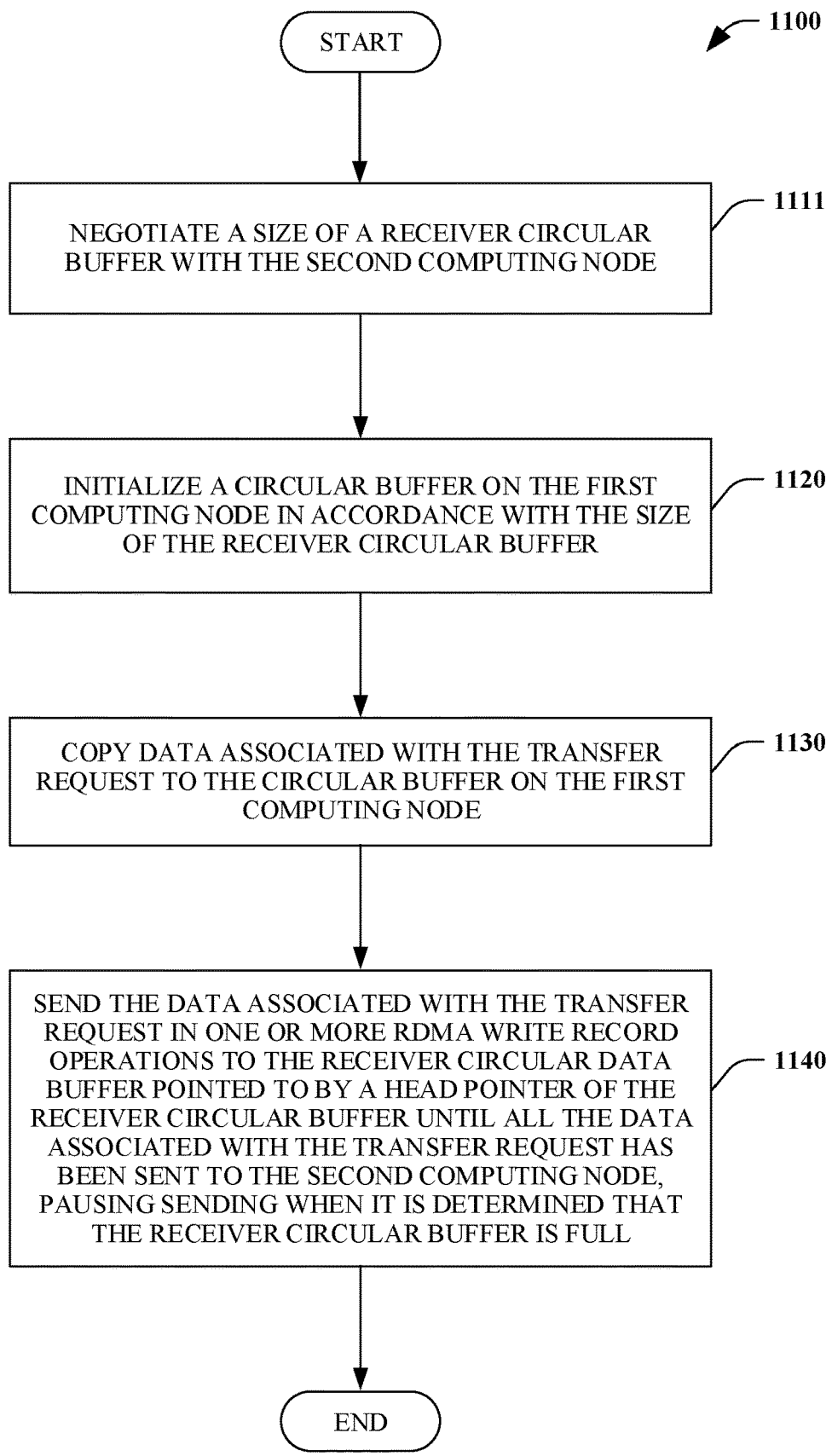

Referring to FIG. 11, a method of utilizing an interface using a protocol for network transport 1100 is illustrated. In some embodiments, the method 1100 is performed by the system 110. The method 1100 corresponds to a medium message send at an interface, for example, when a size associated with the transfer request greater than a first threshold (S) and less than a second threshold (LC).

At 1110, a size of a receiver circular buffer is negotiated with the second computing node. At 1120, a circular buffer on the first computing node in accordance with the size of the receiver circular buffer is initialized. At 1130, data associated with the transfer request is copied to the circular buffer on the first computing node. At 1140, the data associated with the transfer request is sent in one or more RDMA write record operations to the receiver circular data buffer pointed to by a head pointer of the receiver circular buffer until all the data associated with the transfer request has been sent to the second computing node. Sending is paused when it is determined that the receiver circular buffer is full.

Figure 12:
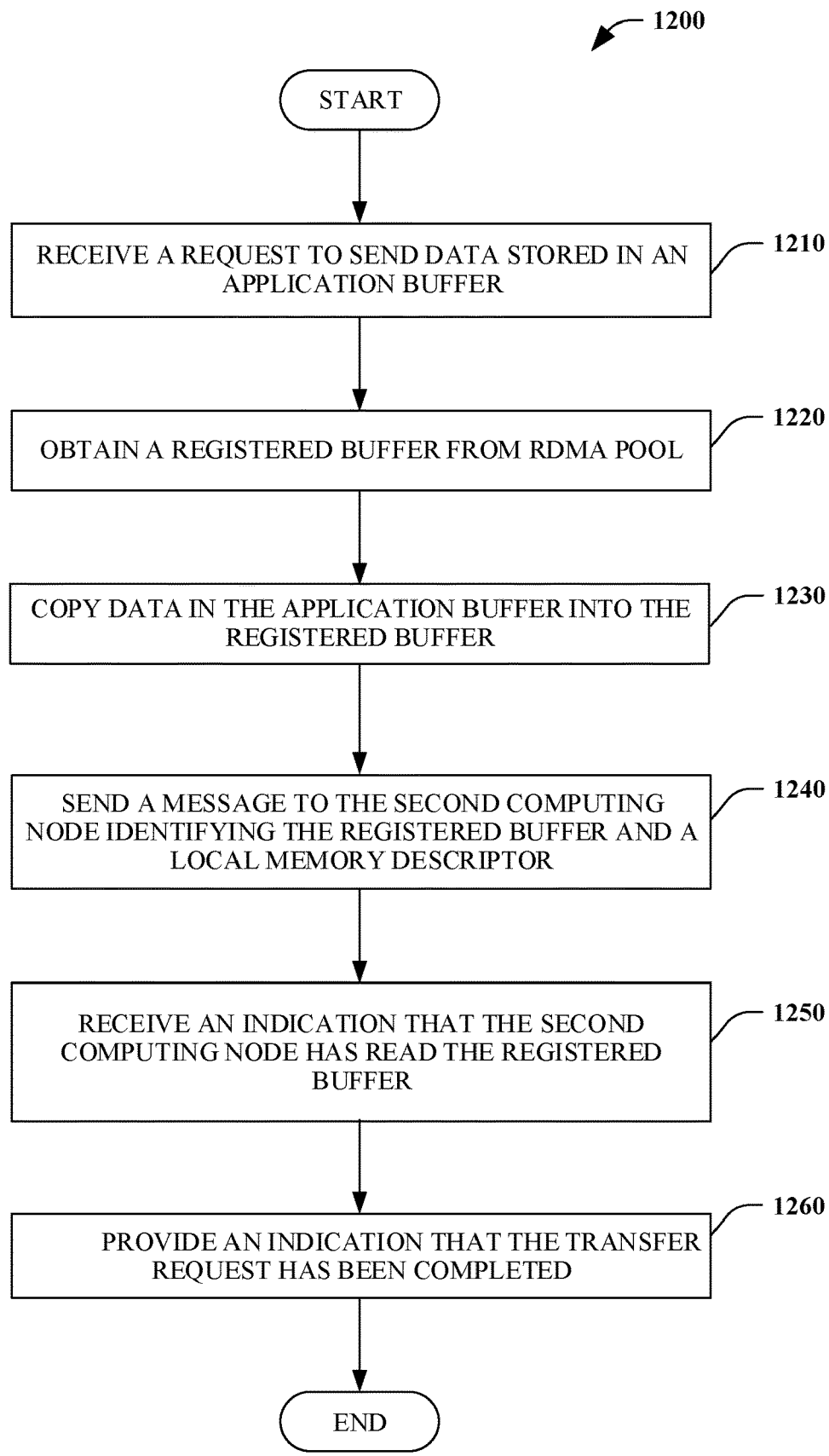

Referring next to FIG. 12, a method of utilizing an interface using a protocol for network transport 1200 is illustrated. In some embodiments, the method 1200 is performed by the system 100. The method 1200 corresponds to a send large message with copy at an interface, for example, when a size associated with the transfer request greater than a second threshold (LC) and less than or equal to a third threshold (L).

At 1210, a request to send data stored in an application buffer is received. At 1220, a registered buffer is obtained from an RDMA pool. At 1230, data in the application buffer is copied into the registered buffer. At 1240, a message is sent to the second computing node (e.g., receiver) identifying the registered buffer and a local memory descriptor. At 1250, an indication is received that the second computing node (e.g., receiver) has read the registered buffer. At 1260, an indication that the transfer request has been completed is provided (e.g., to an application on the sender/first computing node).

Figure 13:
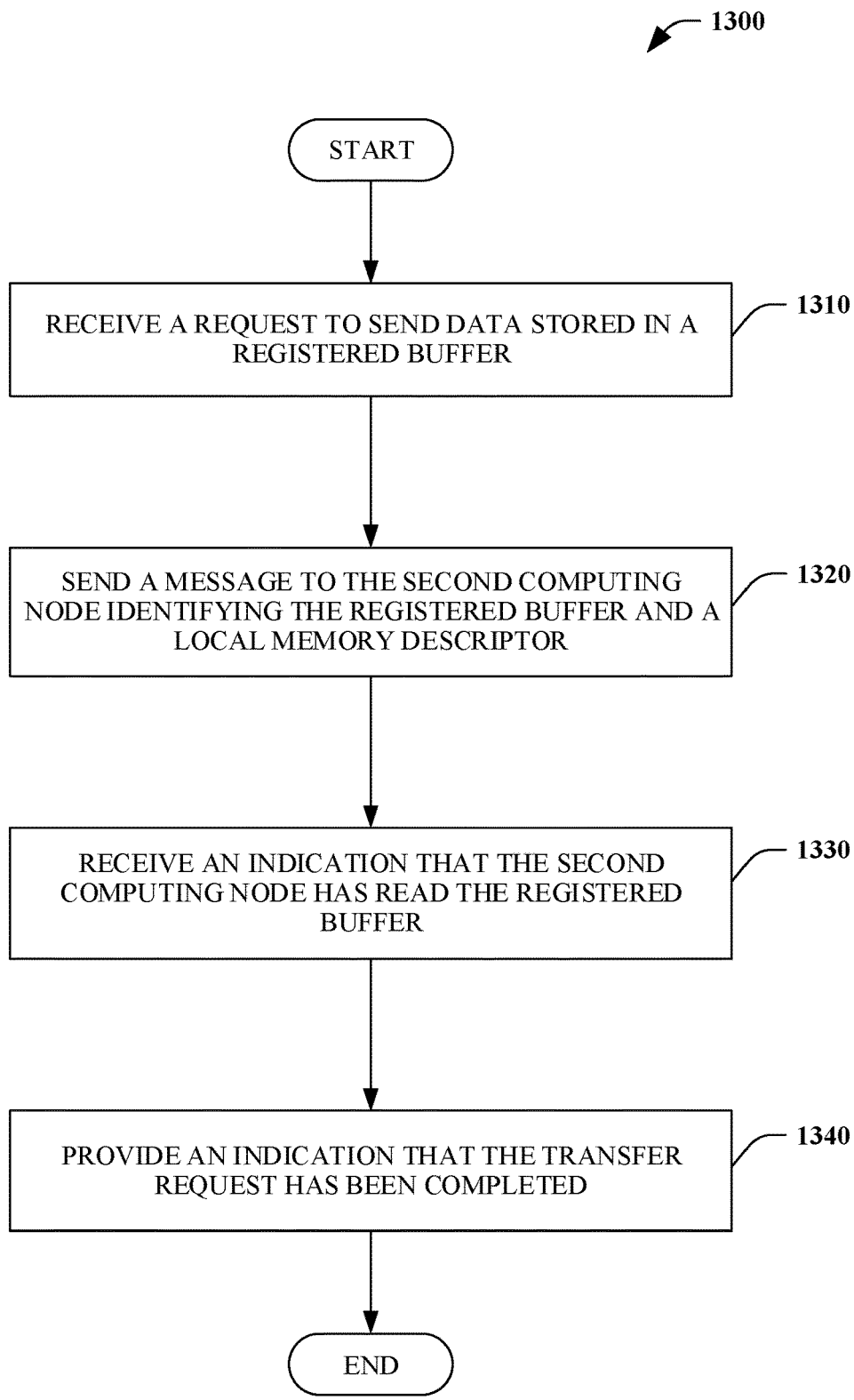

Turning to FIG. 13, a method of utilizing an interface using a protocol for network transport 1300 is illustrated. In some embodiments, the method 1300 is performed by the system 100. The method 1300 corresponds to a large message send at an interface, for example, when a size associated with the transfer request greater than a third threshold (L).

At 1310, a request to send data stored in a registered buffer is received. At 1320, a message is sent to the second computing node identifying the registered buffer and a local memory descriptor. At 1330, an indication is received that the second computing node has read the registered buffer. At 1340, an indication is provided that the transfer request has been completed (e.g., to an application on the sender/first computing node).

Figure 14:
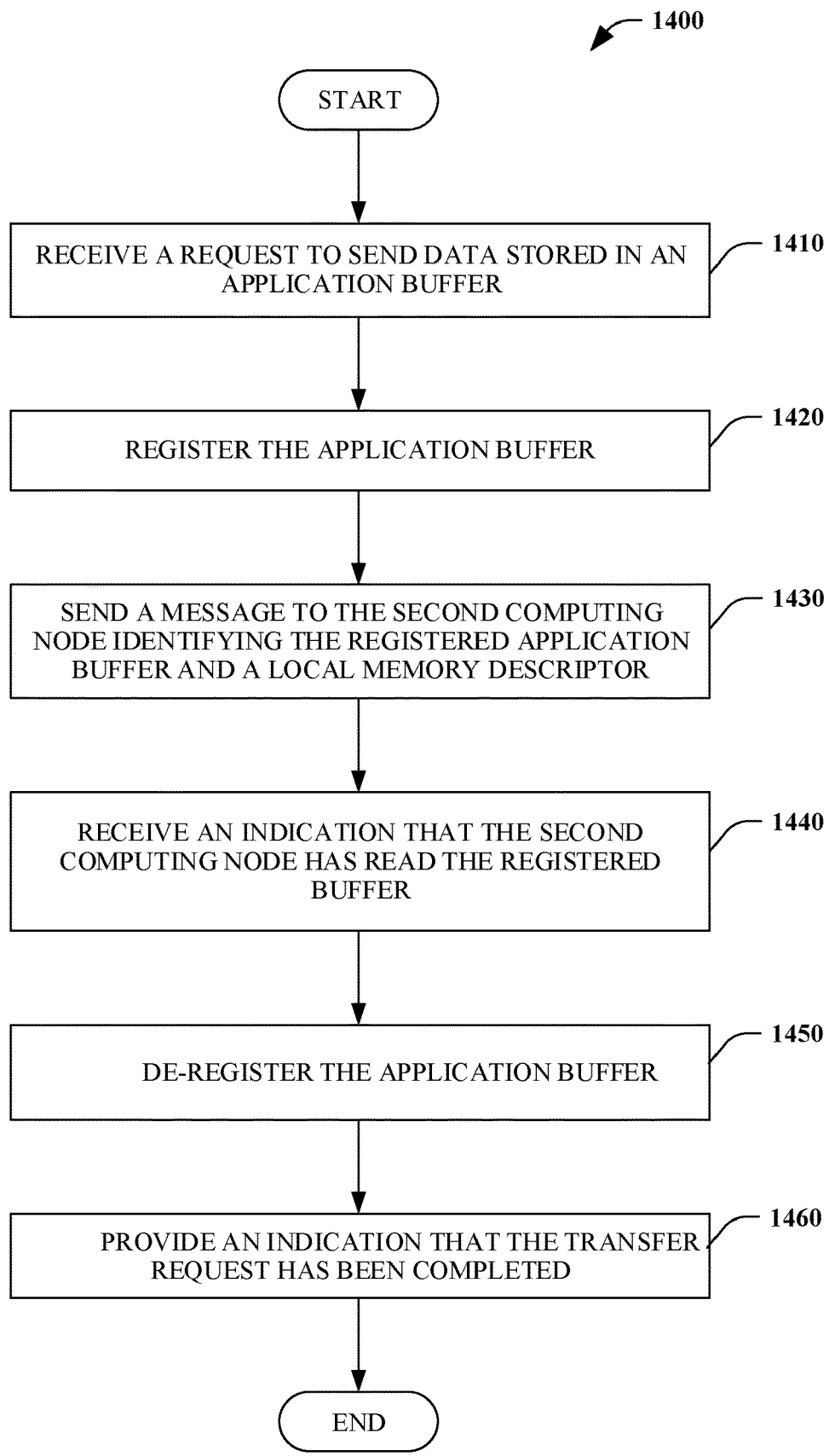

Referring next to FIG. 14, a method of utilizing an interface using a protocol for network transport 1400 is illustrated. In some embodiments, the method 1400 is performed by the system 100. The method 1400 corresponds to a large message send at an interface, for example, when a size associated with the transfer request greater than a third threshold (L).

At 1410, a request to send data stored in an application buffer is received. At 1420, the application buffer is registered. At 1430, a message is sent to the second computing node (e.g., receiver) identifying the registered application buffer and a local memory descriptor. At 1440, an indication is received that the second computing node (e.g., receiver) has read the registered buffer. At 1450, the application buffer is de-registered. At 1460, an indication that the transfer request has been completed is provided (e.g., to an application on the sender/first computing node).

Figure 15:
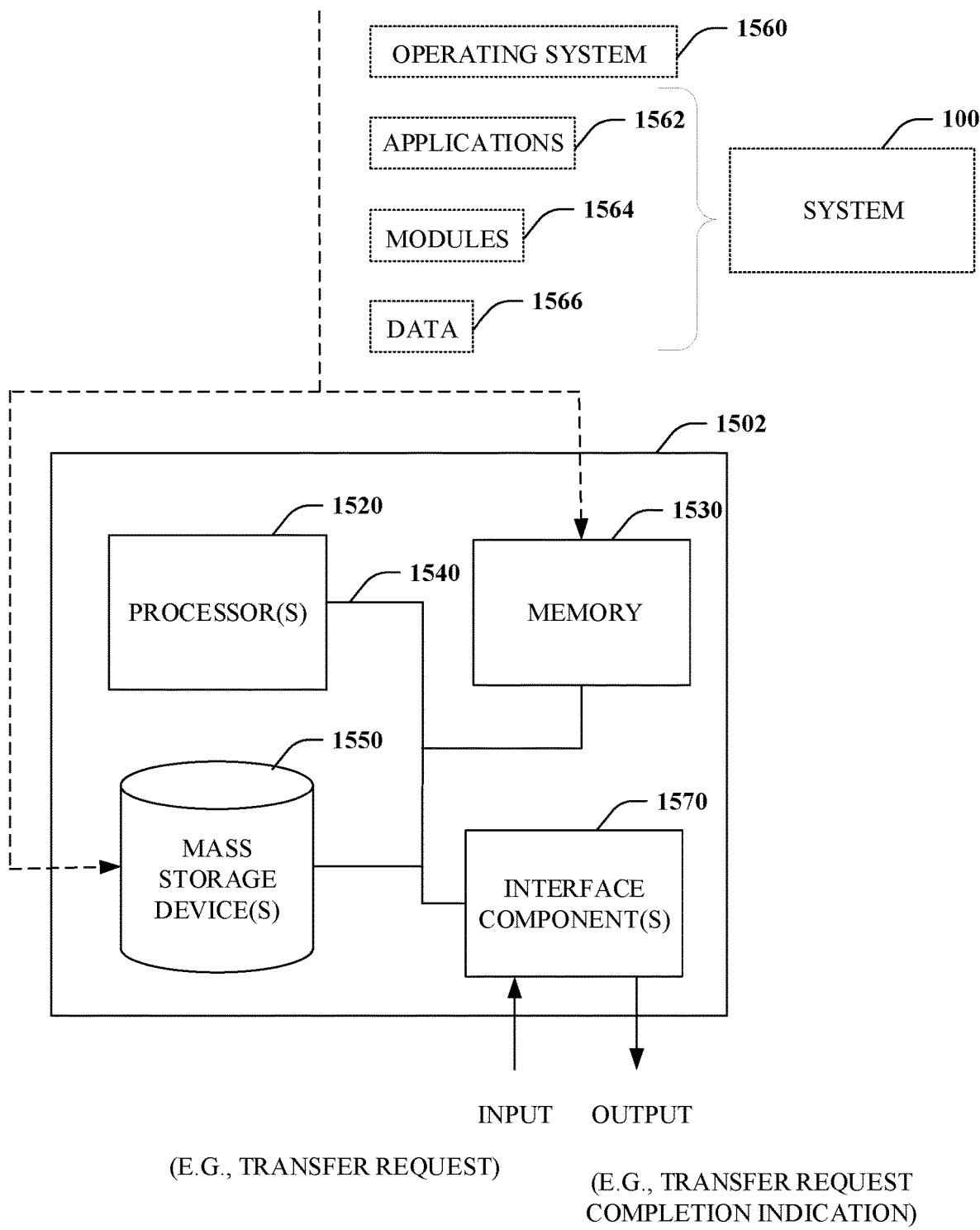
FIG. 15 is a functional block diagram that illustrates an exemplary computing system.

With reference to FIG. 15, illustrated is an example general-purpose computer or computing device 1502 (e.g., mobile phone, desktop, laptop, tablet, watch, server, handheld, programmable consumer or industrial electronics, set-top box, game system, compute node, etc.). For instance, the computing device 1502 may be used in a system for utilizing an interface for network transport 100.

The computer 1502 includes one or more processor(s) 1520, memory 1530, system bus 1540, mass storage device(s) 1550, and one or more interface components 1570. The system bus 1540 communicatively couples at least the above system constituents. However, it is to be appreciated that in its simplest form the computer 1502 can include one or more processors 1520 coupled to memory 1530 that execute various computer executable actions, instructions, and or components stored in memory 1530. The instructions may be, for instance, instructions for implementing functionality described as being carried out by one or more components discussed above or instructions for implementing one or more of the methods described above.

The processor(s) 1520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1520 can be a graphics processor.

The computer 1502 can include or otherwise interact with a variety of computer-readable media to facilitate control of the computer 1502 to implement one or more aspects of the claimed subject matter. The computer-readable media can be any available media that can be accessed by the computer 1502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1530 and mass storage device(s) 1550 are examples of computer-readable storage media. Depending on the exact configuration and type of computing device, memory 1530 may be volatile (e.g., RAM), non-volatile (e.g., ROM, flash memory, etc.) or some combination of the two. By way of example, the basic input/output system (BIOS), including basic routines to transfer information between elements within the computer 1502, such as during start-up, can be stored in nonvolatile memory, while volatile memory can act as external cache memory to facilitate processing by the processor(s) 1520, among other things.

Mass storage device(s) 1550 includes removable/non-removable, volatile/non-volatile computer storage media for storage of large amounts of data relative to the memory 1530. For example, mass storage device(s) 1550 includes, but is not limited to, one or more devices such as a magnetic or optical disk drive, floppy disk drive, flash memory, solid-state drive, or memory stick.

Memory 1530 and mass storage device(s) 1550 can include, or have stored therein, operating system 1560, one or more applications 1562, one or more program modules 1564, and data 1566. The operating system 1560 acts to control and allocate resources of the computer 1502. Applications 1562 include one or both of system and application software and can exploit management of resources by the operating system 1560 through program modules 1564 and data 1566 stored in memory 1530 and/or mass storage device(s) 1550 to perform one or more actions. Accordingly, applications 1562 can turn a general-purpose computer 1502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1562, and include one or more modules 1564 and data 1566 stored in memory and/or mass storage device(s) 1550 whose functionality can be realized when executed by one or more processor(s) 1520.

In accordance with one particular embodiment, the processor(s) 1520 can correspond to a system on a chip (SOC) or like architecture including, or in other words integrating, both hardware and software on a single integrated circuit substrate. Here, the processor(s) 1520 can include one or more processors as well as memory at least similar to processor(s) 1520 and memory 1530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1502 also includes one or more interface components 1570 that are communicatively coupled to the system bus 1540 and facilitate interaction with the computer 1502. By way of example, the interface component 1570 can be a port (e.g., serial, parallel, PCMCIA, USB, FireWire, etc.) or an interface card (e.g., sound, video, etc.) or the like. In one example implementation, the interface component 1570 can be embodied as a user input/output interface to enable a user to enter commands and information into the computer 1502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1570 can be embodied as an output peripheral interface to supply output to displays (e.g., LCD, LED, plasma, etc.), speakers, printers, and/or other computers, among other things. Still further yet, the interface component 1570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A first computing node comprising a processor and a memory having computer-executable instructions stored thereupon which, when executed by the processor, cause the first computing node to:
   provide an interface for using a network transport protocol between the first computing node and a second computing node, the network transport protocol identifying a first threshold and a second threshold;
   receive a transfer request via the interface;
   determine a data size associated with the transfer request;
   select a transfer mode from a plurality of transfer modes to perform the transfer request based at least on the data size when compared to the first threshold and the second threshold, the transfer mode utilizing flow control and at least one remote direct memory access (RDMA) operation; and
   utilize the transfer mode to perform the transfer request, the utilizing comprising:
      when the data size is greater than the first threshold and less than or equal to the second threshold:
         negotiate a size of a second circular buffer on the second computing node;
         initialize a first circular buffer on the first computing node in accordance with the size of the second circular buffer; and
         copy data associated with the transfer request to the first circular buffer; and
         send the data associated with the transfer request in one or more RDMA write record operations to the second circular buffer pointed to by a head pointer of the second circular buffer until all the data associated with the transfer request has been sent to the second computing node, wherein sending is paused when it is determined that the second circular buffer is full based at least on available space between the head pointer and a tail pointer of the second circular buffer; and
      when the data size is greater than the second threshold:
         send a message to the second computing node identifying a registered buffer and a local memory descriptor;
         receive a read indication that the second computing node has read the registered buffer; and
         provide a completion indication that the transfer request has been completed.

2. The first computing node of claim 1, wherein when the data size is less than or equal to the first threshold, the computer-executable instructions, when executed by the processor, further cause the first computing node to:
   negotiate a transfer buffer size and an initial credit quantity with the second computing node;
   copy the data associated with the transfer request to a local registered buffer; and
   send the data associated with the transfer request in one or more RDMA send messages of the transfer buffer size until a current credit quantity is equal to or less than one or until all RMDA send messages of the transfer request have been sent.

3. The first computing node of claim 2, wherein when the data size is less than or equal to the first threshold, the computer-executable instructions, when executed by the processor, further cause the first computing node to:

pause sending the data associated with the transfer request to the second computing node when the current credit quantity is less than or equal to one.

4. The first computing node of claim 1, wherein when the data size is greater than the second threshold, the computer-executable instructions, when executed by the processor, further cause the first computing node to:
register an application buffer to become the registered buffer; and
in response to receiving the read indication, de-register the registered application buffer.

5. The first computing node of claim 1, wherein at least one of the first threshold and the second threshold is determined based upon latency and bandwidth measurements on a target network connection.

6. The first computing node of claim 4, wherein when the data size is greater than the second threshold, the computer-executable instructions, when executed by the processor, further cause the first computing node to:
obtain the registered buffer from a pool; and
copy data in the application buffer to the registered buffer.

7. The first computing node of claim 1, wherein the first computing node controls the tail pointer of the second circular buffer.

8. A method, comprising:
providing an interface for using a protocol for network transport between a first computing node and a second computing node, the protocol identifying a first threshold and a second threshold;
receiving a transfer request;
determining a data size associated with the transfer request;
selecting a transfer mode from a plurality of transfer modes to perform the transfer request based at least on the data size when compared to the first threshold and the second threshold, the transfer mode utilizing flow control and at least one remote direct memory access (RDMA) operation; and
utilizing the selected transfer mode to perform the transfer request, the utilizing comprising:
when the data size is greater than the first threshold and less than or equal to the second threshold:
negotiating a size of a second circular buffer on the second computing node;
initializing a first circular buffer on the first computing node in accordance with the size of the second circular buffer;
copying data associated with the transfer request to the first circular buffer; and
sending the data associated with the transfer request in one or more RDMA write record operations to the second circular buffer pointed to by a head pointer of the second circular buffer until all the data associated with the transfer request has been sent to the second computing node, wherein sending is paused when it is determined that the second circular buffer is full based at least on available space between the head pointer and a tail pointer of the second circular buffer; and
when the data size is greater than the second threshold:
sending a message to the second computing node identifying a registered buffer and a local memory descriptor;
receiving a read indication that the second computing node has read the registered buffer; and
providing a completion indication that the transfer request has been completed.

9. The method of claim 8, wherein when the data size is less than or equal to the first threshold, the method further comprises:
negotiating a transfer buffer size and an initial credit quantity with the second computing node;
copying the data associated with the transfer request to a local registered buffer; and
sending the data associated with the transfer request in one or more RDMA send messages of the transfer buffer size until a current credit quantity is equal to or less than one or until all RDMA send messages of the transfer request have been sent.

10. The method of claim 9, wherein when the data size is less than or equal to the first threshold, the method further comprises:
receiving a credit update message; and
resuming sending the data associated with the transfer request when the current credit quantity is greater than one.

11. The method of claim 8, wherein when the data size is greater than the second threshold, the method further comprises:
registering an application buffer to become the registered buffer; and
in response to receiving the read indication, de-registering the registered application buffer.

12. The method of claim 8, wherein at least one of the first threshold and the second threshold is determined based upon latency and bandwidth measurements on a target network connection.

13. The method of claim 8, wherein the interface is utilized in place of an existing network communication stack.

14. The method of claim 8, wherein the first computing node controls the tail pointer of the second circular buffer.

15. A computer storage media storing computer-readable instructions that, when executed, cause a first computing node to:
provide an interface for network transport using a protocol between the first computing node and a second computing node, the interface identifying a first threshold and a second threshold;
receive a transfer request via the interface;
determine a data size associated with the transfer request;
select a transfer mode from a plurality of transfer modes to perform the transfer request based at least on the data size when compared to the first threshold and the second threshold, the transfer mode utilizing flow control and at least one remote direct memory access (RDMA) operation; and
utilize the transfer mode to perform the transfer request, the utilizing comprising:
when the data size is greater than the first threshold and less than or equal to the second threshold:
negotiate a size of a second circular buffer on the second computing node;
initialize a first circular buffer on the first computing node in accordance with the size of the second circular buffer;
copy data associated with the transfer request to the first circular buffer; and
send the data associated with the transfer request in one or more RDMA write record operations to the second circular buffer pointed to by a head pointer of the second circular buffer until all the data associated with the transfer request has been sent to the second computing node, wherein sending is paused when it is determined that the second circular buffer is full based at least on available space between the head pointer and a tail pointer of the second circular buffer; and when the data size is greater than the second threshold:
send a message to the second computing node identifying a registered buffer and a local memory descriptor;
receive a read indication that the second computing node has read the registered buffer; and
provide a completion indication that the transfer request has been completed.

16. The computer storage media of claim 15, wherein when the data size is less than or equal to the first threshold, the computer-readable instructions, when executed, further cause the first computing node to:
negotiate a transfer buffer size and an initial credit quantity with the second computing node;
copy the data associated with the transfer request to a local registered buffer; and
send the data associated with the transfer request in one or more RDMA send messages of the transfer buffer size until a current credit quantity is equal to or less than one or until all RDMA send messages of the transfer request have been sent.

17. The computer storage media of claim 16, wherein when the data size is less than or equal to the first threshold, the computer-readable instructions, when executed, further cause the first computing node to:
use a memory copy operation to copy the data associated with the transfer request to the local registered buffer.

18. The computer storage media of claim 15, wherein when the data size is greater than the second threshold, the computer-readable instructions, when executed, further cause the first computing node to:
register an application buffer to become the registered buffer; and
in response to receiving the read indication, de-register the registered application buffer.

19. The computer storage media of claim 15, wherein at least one of the first threshold and the second threshold is determined based upon latency and bandwidth measurements on a target network connection.

20. The computer storage media of claim 15, wherein the first computing node controls the tail pointer of the second circular buffer.

* * * * *